Sept. 9, 1969  P. J. BROADBENT  3,465,724
RECORDING AND/OR CONTROL OF THE FEEDING OF LIVESTOCK
Filed April 18, 1967  4 Sheets-Sheet 1

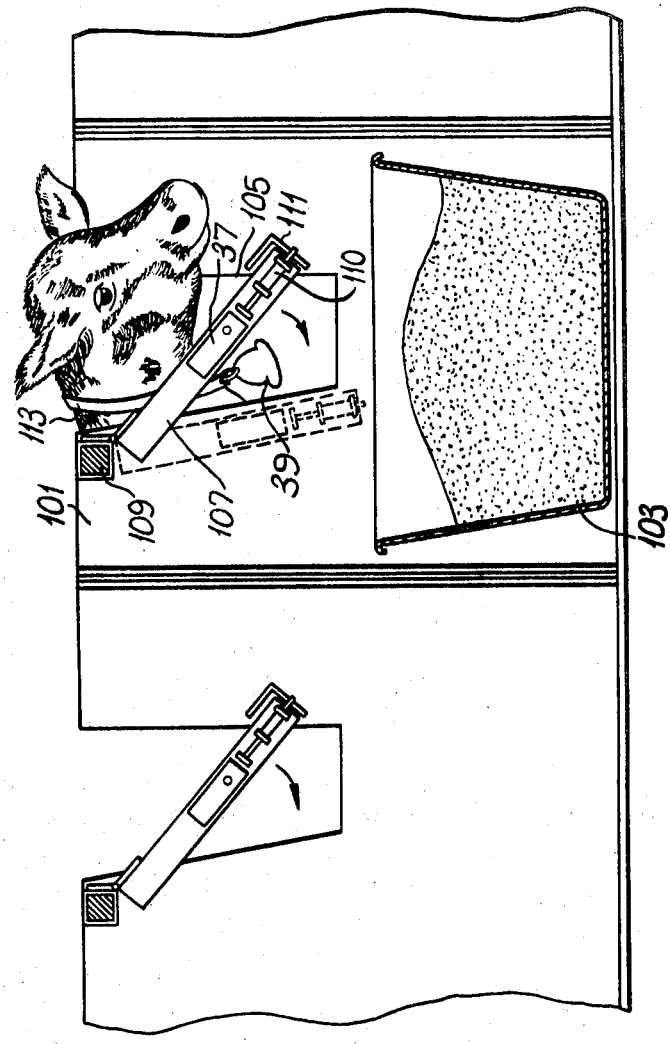

United States Patent Office 3,465,724
Patented Sept. 9, 1969

3,465,724
RECORDING AND/OR CONTROL OF THE
FEEDING OF LIVESTOCK
Peter Jack Broadbent, Echt, Scotland, assignor to National Research Development Corporation, London, England, a British corporation
Filed Apr. 18, 1967, Ser. No. 631,738
Claims priority, application Great Britain, Apr. 21, 1966, 17,531/66
Int. Cl. A01k 5/02
U.S. Cl. 119—51                                            12 Claims

ABSTRACT OF THE DISCLOSURE

The access of livestock penned in a group to a plurality of feed spaces is controlled by barrier means which are rendered ineffective by the interaction of identification means carried by each animal and complementary identification means associated with the barrier means. In this manner selected animals can be allowed access to food in selected feed spaces, so that different animals can be fed on different diets or their inputs of a common diet measured.

---

This invention relates to improvements in the recording and/or control of the feeding of livestock, and one particular application of the invention is in the recording of food intake of particular animals (or other livestock) in a communal group of animals.

In investigating the individual intakes of experimental animals, it is found both more economical and more truly representative of the normal intakes of the individual animals if the animals are penned in a group, or allowed to use a common paddock or field, rather than being penned in separate stalls, styes or the like. The reason that the results obtained with a group of animals contained in a common pen are more truly representative is related to the fact that most livestock are social animals and use of a common pen allows them to exhibit their normal behaviour pattern. When the results of an investigation are applied to a normal group of animals living communally on a farm, the similarity of environment removes one possible reason for commercial results being different from experimental results.

Often the problem is to measure the food intake to each member of a group of animals penned in a group. In some instances, a group of, say, twenty-four animals may be split into six sub-groups, each consisting of four animals, and the problem then is to measure the total food intake to each sub-group of animals.

Another form which the problem may take is that of controlling, rather than measuring, the food intake to individual animals of the group, or the feed intake to the animals in a sub-group of the group. Thus it may be desired to feed six sub-groups respectively on six different diets.

An object of the present invention is thus the provision of improved feeding apparatus for livestock penned in a group, in which the food intake to each member of the group, or in which the total food intake of all the members of a sub-group contained in the group, can be measured or controlled separately from that of other members of the group.

According to the present invention, feeding apparatus for livestock penned in a group comprises a plurality of feed spaces, the entrances to which are accessible to all the animals in the group, barrier means by which access to each of the feed spaces by the animals can be rendered impossible, difficult or unpleasant, and identification means carried by each animal and effective automatically to render the barrier means associated with a particular feed space allocated to that animal readily accessible but ineffective to permit access by that animal to the other feed spaces.

The invention will now be described, by way of example, with reference to the accompanying drawings, in which:

FIGURE 6 illustrates an alternative form of barrier means for preventing access by an animal to a feed receptacle.

Figure 1:
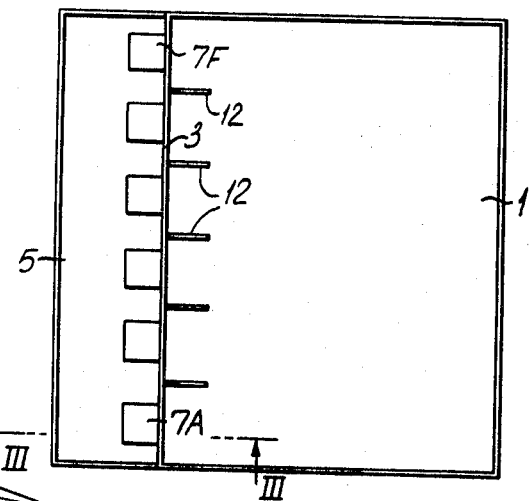
FIGURE 1 is a diagrammatic plan view of a common pen for several animals and of separate feed receptacles for those animals.
Figure 2:
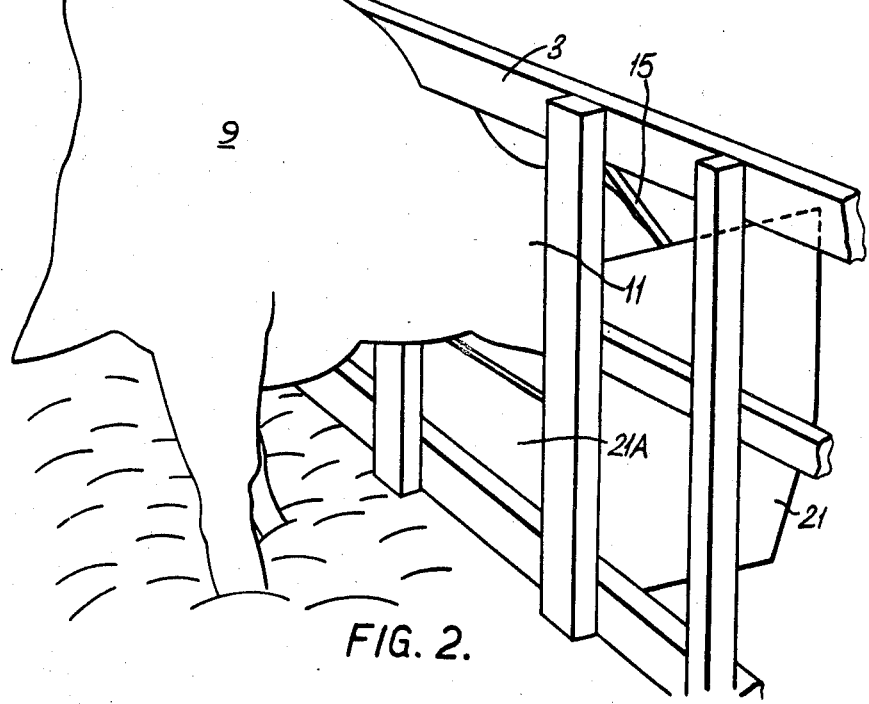
FIGURE 2 is a perspective drawing of one of the animals making use of its individual feed receptacle.

Referring first to FIGURE 1, a communal pen 1 is utilised to contain six animals and is separated by a partition 3 from a compartment 5 which contains separate feed receptacles 7A to 7F. Each feed receptacle 7A to 7F is accessible, as indicated in FIGURE 2, to an animal 9 through an aperture 11 in the partition 3. Wing barriers 12 are provided to ensure that only one animal at a time can use each feed receptacle.

Figure 3:
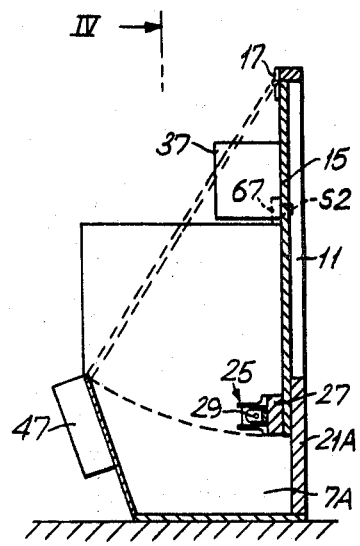
FIGURE 3 is a sectional side elevation of a feed receptacle shown in FIGURES 1 and 2, and is taken on the lines III—III of FIGURES 1 and 4 and as viewed in the direction indicated by the arrows.
Figure 4:
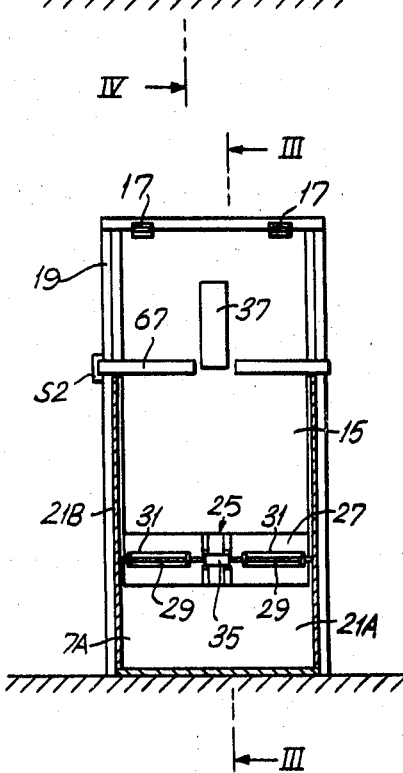
FIGURE 4 is a sectional rear view taken on the lines IV—IV of FIGURE 3.

Referring now to FIGURES 3 and 4, access through each aperture 11 can be blocked by a flap 15 which is pivoted along its upper edge on two hinges 17 screwed to the flap and to the horizontal upper member of a wooden framework 19. This flap 15, when in the closed position shown in FIGURE 3, co-operates with the front wall 21A of feed receptacle 7A to prevent access by an animal to feed within the receptacle. To lock the flap in this closed position, a magnetic lock 25 is mounted on a cross member 27 on the rear side of the flap near its bottom edge. This magnetic lock includes two horizontally extending rods 29 each slidably mounted in a bent-metal bracket 31 and each biased outwardly be a compression spring 33 (see FIGURE 5) acting between an abutment 34 on the rod and one of the ends of bracket 31. These two rods, when in their outward position, engage in suitable holes in the side walls 21B of the receptacle 7A to prevent pivotal movement of the lower edge of the flap 15 away from the front wall 21A. The inner ends of these two rods 29 extend within the central aperture of a solenoid 35 which when energised is effective to draw these two rods inwardly through a sufficient distance for them to disengage from the holes in the side walls, so that the flap 15 can be opened.

On the rear side of the flap 15 is mounted an oscillator unit 37, tuned to the frequency of 20 kilocycles per second and including (see FIGURE 5) coils L1, L2 and L3 which are disposed adjacent the flap 15. Flap 15 is made of wood, but alternatively it, or the part adjacent the oscillator unit, could be made of any suitable nonmagnetic material. Each of the flaps associated respectively with the other feed receptacles 7B to 7F is similarly provided with an oscillator unit but the six oscillators are tuned respectively to the frequencies 20, 40, 60, 80 and 100 kilocycles per second. Each oscillator is so adjusted that, while it is oscillating in a steady manner, it would require only little extra damping of the tuned circuits to prevent oscillation.

Each of the six animals in the pen 1 has mounted on its forehead, in a suitable harness, a small container 39 (see FIGURE 5) of a nonmagnetic material and containing a series tuned circuit including an inductance L4 and a capacitor C4. These six tuned circuits are tuned respectively to the six frequencies mentioned above and, since each provides a closed circuit for currents induced in the inductance L4, each tuned circuit will dissipate considerable power in its resistive component when energised by a fluctuating magnetic field of the tuned frequencies.

The position of the oscillator unit 37 on the flap 15 is so selected that when an animal in the pen attempts to push open the flap to obtain access to food in the receptacle 7A, the container 39 on that animal's forehead will lie adjacent the oscillator unit 37. Whichever animal attempts to open the flap, an alternating E.M.F. will be induced in the inductance L4 by the alternating currents flowing in the inductances L1, L2 and L3. However, only in the case of the animal having the circuit tuned to the same frequency as that of the oscillator unit 37 will the currents set up by this alternating E.M.F. be sufficient to cause dissipation of considerable power in the resistive component of that tuned circuit.

It follows that the animal allocated to the feed receptacle 7A can, as his head approaches the flap 15 of that receptacle, cause sufficient power to be dissipated in the tuned circuit mounted on its forehead to render the oscillator unit 37 of feed receptacle 7A non-oscillating. It would perhaps be more precise to say that this additional damping of the tuned circuit of the oscillator unit prevents the building up of steady oscillation in the tuned circuit since inherently such a circuit will repeatedly start to oscillate, but being heavily damped the oscillation will die out quickly.

Similarly each of the other five animals respectively can render the oscillator units of the other five feed receptacles non-oscillatory. It will be seen that each of the six penned animals can change the state of the oscillator unit only of the feed receptacle allocated to it.

Figure 5:
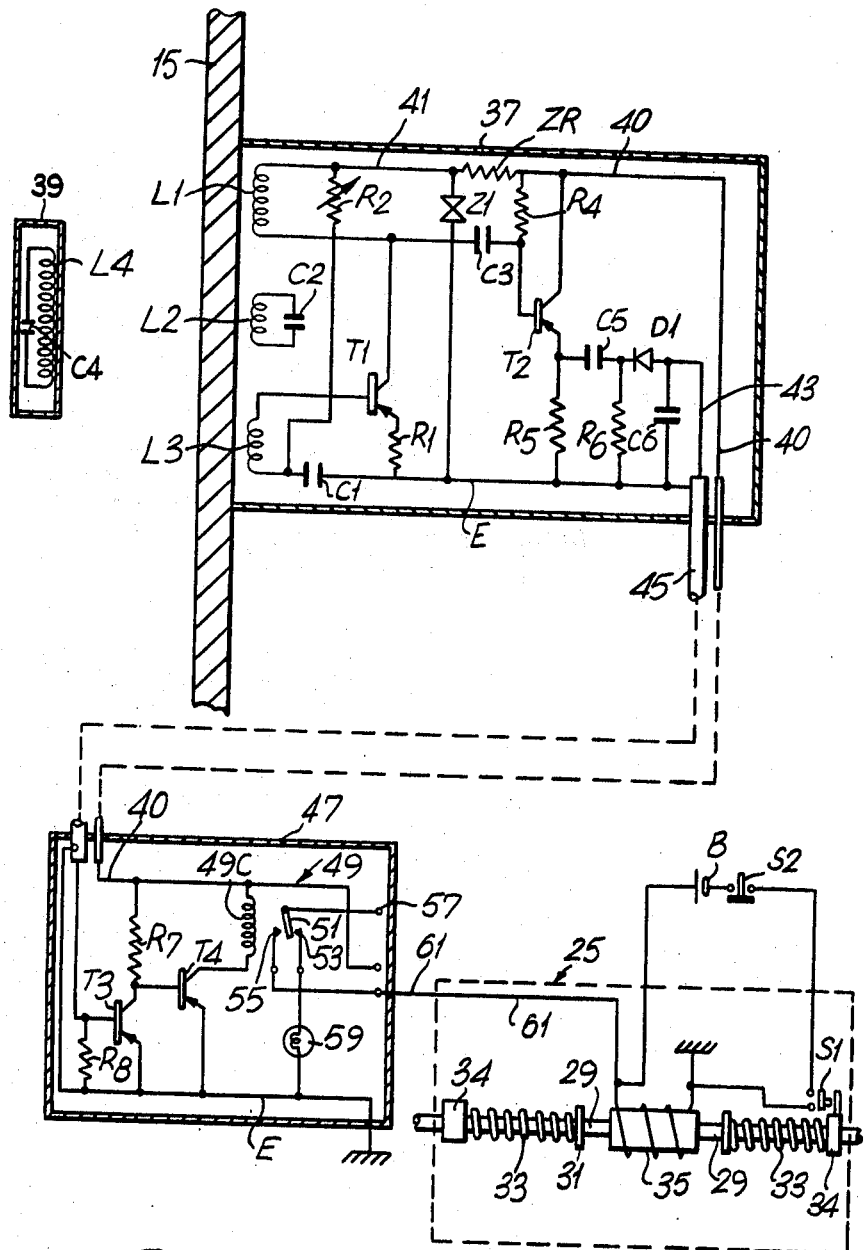
FIGURE 5 is a circuit diagram of electric and electronic circuits of components shown in FIGURES 3 and 4.

The oscillator unit 37 has the circuit indicated in FIGURE 5 and includes a tuned circuit consisting of inductance L2 and capacitor C2 connected in series and with that inductance L2 loosely coupled to the inductances L1 and L3. The resonant frequency of the series combination of inductance L2 and capacitor C2 determines the tuned frequency of this oscillator unit. The circuit includes an earthed line E and a lead 40 to which a voltage of $-12$ volts (with respect to earth line E) is applied. A lead 41 is connected to lead 40 through a resistor ZR of 270 ohms and a Zener diode Z1 connected between line E and lead 41 stabilises the voltage on lead 41 at $-12$ volts. Inductance L3 is connected between the base of a p-n-p transistor T1 and a capacitor C1 of 0.05 microfarad, the other side of which is connected to the earth line E. The emitter of this transistor is connected through the resistor R1 of 47 ohms to the earth line E. A "variable" resistor R2 of 22,000 ohms (all in) is connected between the lead 41 and the junction of inductance L3 and capacitor C1. The inductance L1 is connected between the lead 41 and the collector of transistor T1, and also through a capacitor C3 of 100 picofarads to the base of a second p-n-p transistor T2. The base of transistor T2 is also connected through a resistor R4 of one megohm to the lead 40, and the collector of this transistor is connected directly to that lead. The emitter of transistor T2 is connected through a resistor R5 of 22,000 ohms to earth line E and through a capacitor C5 of 0.01 microfarads and a diode D1 to the inner conductor 43 of a coaxial cable 45, the outer conductor of which is connected to the earth line E, of which it forms a continuation. The junction of capacitor C5 and the diode D1 is connected to the earth line E through a resistor R6 of 6,800 ohms. The other side of the diode D1 is connected through a capacitor C6 of 0.03 microfarad to the earth line E.

In the circuit described above the transistor T1 is adjusted by the variable resistor R2 to render the circuit oscillatory near the operating point at which it would go out of oscillation. Alternatively, or in addition, tuning can be effected by selective positioning of a piece of transformer steel positioned adjacent to the series combination of inductance L2 and capacitor C2, which piece of steel is then clamped in position. Transistor T2 is an emitter follower. The oscillation from transistor T1 after passing through the transistor T2 are rectified by the diode D1, and the output from this diode holds the conductor 43 negative as long as the tuned circuit remains oscillatory.

The coaxial cable 45 and the lead 41 are connected to a relay unit 47 which is mounted on the rear side of the feed receptacle 7A. Unit 47 includes a p-n-p transistor T3 to the base of which is connected the conductor 43, to the emitter of which is connected the earth line E and the collector of which is connected through a resistor R7 of 100,000 ohms to the line 41. The base of transistor T3 is also connected through a resistor R8 of 4,700 ohms to its emitter. The collector of this transistor is also connected to the base of a p-n-p transistor T4, the emitter of which is connected to the earth line E and the collector of which is connected through the operating coil 49C of a relay 49 to the line 41. Relay 49 includes a movable contact 51 which normally engages a contact 53 but when the coil 49C is energised engages a contact 55. Movable contact 51 is connected through terminal 57 to one pole of a suitable source of power, the other pole of which is connected to the earth line E. Terminal 53 is connected through an indicator lamp 59 to the earth line E, and terminal 55 is connected by a lead 61 through the solenoid 35 to earth.

Solenoid 35 is also connected in a series circuit consisting of normally-open switch S1, a normally-closed switch S2, and a battery B capable of energising the solenoid. Switch S1 is closed by abutment 34 when the associated rod 29 is moved inwardly by the energised solenoid 29. Switch S2 is held open by a batten 67 carried by the flap 15 but is allowed to close when the flap is opened.

The negative voltage from diode D1 is thus applied to the base of transistor T3 which therefore conducts heavily so that its collector operates at nearly the voltage on earth line E. Since this voltage is applied to the base of transistor T4 the emitter of which is at the voltage on earth line E, this transistor T4 is cut off and the relay coil 49C carries no appreciable current. As a result the indicator lamp 59 is lit but the solenoid 35 is not energised, so that the magnetic lock is in the state which prevents the flap 15 being opened by an unauthorised animal.

When the animal which has been allocated to the feed receptacle 7A tries to open the flap 15 of that receptacle, the effect of the damping circuit carried on its forehead is to cause the oscillatory unit 37 to go out of oscillation. The negative output voltage from diode D1 then disappears, the base of transistor T3 tends to approach the voltage of the earth line E, so that this transistor T3 tends to cut off. As this happens the voltage on its collector goes more negative, so that the transistor T4, to the base of which this voltage is applied, commences to conduct, passing current through the relay operating coil 49C, which moves the movable contact 51 to the contact 55 so that the solenoid 35 of the magnetic lock is energised. The two rods 29 are both moved inwardly to disengage from the holes in the receptacle side walls, and the authorised animal is able to move the flap 15 rearwardly to obtain access to the food in the receptacle.

The damping coil carried by the animal is effective to cause the oscillation to cease when the distance between the damping circuit and the oscillator unit 37 is about eight inches so that, even allowing for a thickness of the flap 15 of about one inch, no exact positioning of the head of the animal is required to operate the flap circuits. It is important the magnetic lock be released before the animal pushes the flap 15, since the pressure on the flap will cause frictional binding of the rods 29 in their holes.

Once the authorised animal has moved the flap 15, the solenoid 35 is energised by the battery B and will remain energised by that battery until the animal allows the flap 15 to close. Thus it does not matter that the container 39 moves away from the oscillator unit 37 during feeding by the animal—the magnetic lock remains properly energised.

It will be seen that the apparatus described above permits an allocation to one or more animals of a group, in a common pen, of a single feed receptacle, and ensures that this animal or animals cannot use other feed receptacles, and that other animals cannot use that receptacle.

In the apparatus described above, each animal is positively precluded from opening a barrier associated with feed receptacles other than the barrier associated with a feed receptacle allocated to that animal. The invention can also be carried out by using some form or deterrent which will cause an animal to avoid feed receptacles other than that allocated to it. The deterrent can be in the form of barrier means in the form of a bright light, or sound producing means, or electrical shock producing means, or other suitable means. Since the animal has ready access to its own source of food, in most cases a relatively feeble deterrent will be sufficient.

Further, in the embodiment of the invention described above all six feed receptacles utilise basically similar barrier means, and this is advantageous in that it enables the use of standard oscillator units (apart from the tuned circuits), relay units and magnetic locks. If desired, different barrier means could be used for different feed receptacles. For example, different animals could carry different forms of identification means producing respectively different optical, magnetic mechanical or other responses in the barrier means associated respectively with their allocated feed receptacles.

The invention can also be applied to barriers leading from a communal paddock or field, to control access by the animals normally penned in that paddock or field to other paddocks, fields or parts of a field particularly allocated to certain of the animals. Where an animal is to be permitted to pass completely through a barrier, then the design of the barrier must preclude a second unauthorised animal from passing through in close proximity to the authorised animal. A double gate system can be used, the gates being at opposite ends of a narrow pen and being interlocked so that the second gate can be unlocked only when the first gate is closed. If the length of the pen is properly selected, the second animal will prevent closure of the first gate and thus prevent opening of the second gate. When the barrier is used to control access to a second field or paddock, a further one-way barrier is required to permit animals to return to the original field or paddock. No locking device is needed for this further barrier.

In the embodiment of the invention illustrated by way of example, the feed receptacles are shown as being separate entities, but in commercial production it would be more economical to construct the set of six feed receptacles complete with their barriers as a unit.

The container 39 alternatively may be mounted on any suitable part of the animal's body other than the head. It may be attached by adhesion, subcutaneous implantation or other surgical means, as alternatives to the use of a harness. In a case where the position of mounting on the body is not on the head, the oscillator unit 37 will not be on the flap 15, and might well be on one of the wing barriers 12.

The type of magnetic lock illustrated may tend to acquire sufficient residual magnetism during prolonged energisation to retain the lock open for a short period after de-energisation. The need for continuous energisation can be eliminated if the locking rods 29 are modified so that they will not experience considerable friction as the flap 15 returns to its closed position, as a result of which considerable friction, the flap may not be able to close. One can then rely upon the head of the animal keeping the flap open even if the oscillator unit 37 goes into oscillation during feeding by the animal. Thus the outer ends of the rods 29 can extend freely into grooves which permit free movement of the flap, but are provided with a movable latch of the type used in one form of gate lock and which will not allow the rod to move in the flap-opening position unless the rod is retracted, but will pivot to allow the rod to revert to its original position with the flap closed, even when the rod 29 is in its outward position. Alternatively, each rod can be replaced by a movable cam member offering an abutment towards the rear, which can engage a fixed abutment to hold the flap 15 closed, and offering an inclined surface towards the front, which can ride up over the fixed abutment as the flap 15 returns to its closed position. In this arrangement, the solenoid will lift the cam member to disengage it from the first abutment.

The device carried by the animal has the considerable practical advantage that it requires no energising battery, and if alternative devices are to be carried by the animal preferably they also should have this advantage. For example, radioactive sources may be used.

Although in the example illustrated the feed receptacle 7A is so formed that it can properly contain the feed, if desired a removable feed receptacle can be fitted into a framework which conveniently can be similar to the receptacle shown but with the rear side omitted. In this case, the relay unit 47 also can be mounted on the flap 15 and if desired can be included in a composite unit with the oscillator unit 37. If continuous recording of times of feeding and quantities of food eaten is required, this can be carried out by a recording device associated with a weighing device by which the removable feed receptacle is supported.

Referring now to the embodiment of the invention shown in FIGURE 6, in this arrangement a barrier 101 is arranged in front of the food receptacle 103, the barrier 101 being formed with a vertically extending slot 105 of such size that only one animal can fit its head into this limited slot at a time. A gate 107 is pivotally mounted by a hinge 109 on the barrier 101, and is spring biassed upwardly towards the position shown in FIGURE 6 in full outline. Once in this position, the gate 107 is locked in place by engagement of an electromagnetically operated latch 110 with a bracket 111. The animal is provided with a neck collar 113 carrying the container 39 while the oscillator unit 37 is mounted on the gate 107 in a position in which it will be closely approached by the container 39. As in the embodiment described above, the container 39 of the animal or animals to which the feed receptacle is allocated is effective to cause, through the oscillator unit 37, the latch 110 to be released so permitting the animal to open the gate to the position shown in the dotted outline in FIGURE 6, and so obtain access to the food receptacle.

I claim:

1. For use in controlled feeding of livestock penned in a group with a plurality of separate feeding spaces each individual to a particular animal and provided with deterrent means, the animals being provided with means for overcoming the deterrent when presenting themselves for feeding at their own individual feeding spaces but not when presenting themselves at any other feeding space, apparatus comprising:
   a deterrent member adapted to be secured in respect to a feed space;
   electronic oscillator means, said oscillator means being tuned to oscillate to provide an electromagnetic field cyclically fluctuating at a given frequency;
   passive resonance means for mounting on an animal, said passive means being tuned to resonate at the said given frequency and thereby to damp oscillation of the oscillator when brought by the animal within said fluctuating field;
   energizing means for actuating said deterrent member; and
   electronically conducting means between said oscillator means and said energizing means for conducting a signal to said energizing means when oscillation of said oscillator means is damped by the presence of said passive means in said electromagnetic field.

2. Apparatus as in claim 1 wherein said deterrent member is in the form of a barrier that is adapted physically to prevent animals other than the animal carrying a correctly tuned passive resonance means, from gaining access to the feeding space.

3. Apparatus as claimed in claim 1 wherein said deterrent member is in the form of sound producing means which is adapted to be actuated by the correctly tuned passive means to prevent production of deterrent sound only when the approaching passive resonance means is the correctly tuned means.

4. Apparatus as claimed in claim 1 in which the barrier means are in the form of a bright light serving as a deterrent to the close approach of any animal to whom the associated feed space has not been allocated.

5. Apparatus as claimed in claim 1 in which the barrier means are in the form of electrical shock producing means serving as a deterrent to the close approach of any animal to whom the assoicated feed space has not been allocated .

6. For use in controlled feeding of livestock penned in a group with a plurality of separate feeding spaces each individual to a particular animal and provided with deterrent means, the animals being provided with means for overcoming the deterrent when presenting themselves for feeding at their own individual feeding spaces but not when presenting themselves at any other feeding space, apparatus comprising:
a deterrent member adapted to be movably secured in one respect relatively to a feeding space;
locking means adapted to secure said deterrent member in another respect relatively to said feeding space;
electronic oscillator means, said oscillator means being tuned to oscillate to provide an electromagnetic field cyclically fluctuating at a given frequency;
passive resonance means for mounting on an animal said passive means being tuned to resonate at the said given frequency and thereby to damp oscillation of the oscillator when brought by the animal within said fluctuating field;
energizing means for actuating said locking means to release said deterrent member from being secured in said other respect relatively to said feeding space; and
electronically conducting means between said oscillating means and said energizing means and adapted to conduct a signal to said energizing means when oscillation of said oscillator means is damped by the presence of said passive resonance means in said electromagnetic field.

7. Apparatus as claimed in claim 6 wherein said deterrent member is in the form of a barrier that is adapted physically to prevent animals other than the animal carrying a correctly tuned passive resonance means, from gaining access to the feeding space.

8. Apparatus as in claim 1 wherein said oscillator means includes:
a tuned circuit;
first and second inductances;
said tuned circuit being coupled to said first and second inductances; and
wherein said tuned circuit determines the tuned frequency of operation of said oscillator means.

9. Apparatus as in claim 8 further including:
means coupled between said first and second inductors for stabilizing the voltage therebetween.

10. Apparatus as in claim 1 wherein said energizing means includes:
transistor means;
relay means operatively associated with said transistor means, said transistor means enabling the selective energization of said relay means; and
solenoid means operatively associated with said relay means, the opeartion of said relay means enabling the energization of said solenoid means;
thereby enabling the movement of said deterrent member by said animal so that the animal is permitted access to a respective feeding space.

11. Apparatus as in claim 10 wherein said energizing means further includes:
means operatively associated with said solenoid means to enable the continual energization of said solenoid means as long as said deterrent member is displaced from its normal position of blocking access to said feeding spaces by said animal.

12. Apparatus as in claim 11 wherein said means for enabling the continual energization of said solenoid means includes:
a first normally-open switch;
a second normally-closed switch in selective circuit with said first switch; and
an energy source in selective circuit with said first and second switches and with said solenoid means for energizing said solenoid when said deterrent member is displaced from its normal position.

References Cited

UNITED STATES PATENTS

| | | | |
|---|---|---|---|
| 945,242 | 1/1910 | Merrill | 119—63 |
| 1,874,137 | 8/1932 | Steel | 119—54 |
| 1,964,819 | 7/1934 | Horst | 340—196 X |
| 2,761,421 | 9/1956 | Burkey | 119—3 |
| 2,774,060 | 12/1956 | Thompson | 340—258 |
| 2,790,071 | 4/1957 | Gunn | 340—38 |
| 2,818,732 | 1/1958 | Bennett | 340—195 |
| 3,112,731 | 12/1963 | Lako et al. | 119—51.12 |
| 3,180,321 | 4/1965 | Aldinger | 119—51 |

ALDRICH F. MEDBERY, Primary Examiner

U.S. Cl. X.R.

340—258; 119—1